US009963357B2

(12) United States Patent
Alkhazraji et al.

(10) Patent No.: US 9,963,357 B2
(45) Date of Patent: May 8, 2018

(54) MOS2 FOAM

(71) Applicant: The Petroleum Institute, Abu Dhabi (AE)

(72) Inventors: Saeed Alhassan Alkhazraji, Abu Dhabi (AE); Salama Almarzouqi, Abu Dhabi (AE)

(73) Assignee: KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 0 days. days.

(21) Appl. No.: 15/050,499

(22) Filed: Feb. 23, 2016

(65) Prior Publication Data
US 2016/0244335 A1 Aug. 25, 2016

Related U.S. Application Data

(60) Provisional application No. 62/119,534, filed on Feb. 23, 2015.

(51) Int. Cl.
| | | |
|---|---|---|
| *C01G 39/06* | (2006.01) | |
| *B01J 20/02* | (2006.01) | |
| *B01J 20/28* | (2006.01) | |
| *B01J 20/30* | (2006.01) | |
| *C10M 103/06* | (2006.01) | |
| *B01D 15/00* | (2006.01) | |

(Continued)

(52) U.S. Cl.
CPC .............. *C01G 39/06* (2013.01); *B01D 15/00* (2013.01); *B01J 20/0266* (2013.01); *B01J 20/28014* (2013.01); *B01J 20/305* (2013.01); *B01J 20/3078* (2013.01); *B01J 27/051* (2013.01); *B01J 35/10* (2013.01); *C10M 103/06* (2013.01); *G10K 11/162* (2013.01)

(58) Field of Classification Search
CPC ................ B01J 27/051; B01J 20/28014; B01J 20/3078; B01J 20/305; B01J 20/0266; C01G 39/06
USPC ............... 502/220; 423/242.1, 244.01, 244.1
See application file for complete search history.

(56) References Cited

U.S. PATENT DOCUMENTS

| | | | | |
|---|---|---|---|---|
| 4,243,553 A | * | 1/1981 | Naumann | .............. B01J 27/051 |
| | | | | 423/53 |
| 4,243,554 A | * | 1/1981 | Naumann | .............. B01J 27/051 |
| | | | | 423/53 |

(Continued)

FOREIGN PATENT DOCUMENTS

CN    1034466710 A    12/2013

OTHER PUBLICATIONS

"Thermal decomposition of (NH4)2MoO2S2, (NH4)MoS4, (NH4)2WO2S2 and (NH4)2WS4," T. P. Prasad et al. Journal of Inorganic and Nuclear Chemistry, vol. 35, Issue 6, (Jun. 1973), pp. 1895-1904 (Abstract only).*

(Continued)

*Primary Examiner* — Patricia L. Hailey
(74) *Attorney, Agent, or Firm* — 24IP Law Group; Timothy R DeWitt

(57) ABSTRACT

A method for the synthesis of molybdenum disulphide foam wherein the porosity of the foam can be controlled. The porosity of the foam is employed to adapt the foam to various processes and specific requirements. The foam molybdenum disulphide structures have internal cavities are interconnected to create a large processing surface area.

4 Claims, 1 Drawing Sheet

(51) Int. Cl.
  *B01J 27/051*   (2006.01)
  *B01J 35/10*    (2006.01)
  *G10K 11/162*   (2006.01)

(56) References Cited

U.S. PATENT DOCUMENTS

| | | | | |
|---|---|---|---|---|
| 4,323,480 | A | * | 4/1982 | Dines .................. B82Y 30/00 252/519.2 |
| 4,590,314 | A | * | 5/1986 | Kinkade ................ C07C 29/16 502/220 |
| 4,822,590 | A | * | 4/1989 | Morrison ............... C01B 17/20 106/DIG. 2 |
| 4,853,359 | A | * | 8/1989 | Morrison ............... B01J 27/04 208/143 |
| 4,994,498 | A | | 2/1991 | Kinkade |
| 7,060,650 | B2 | * | 6/2006 | Rendina ................ C10G 1/083 502/216 |
| 7,223,713 | B2 | | 5/2007 | Alonso |
| 8,673,805 | B2 | | 3/2014 | Amand et al. |
| 2003/0144155 | A1 | | 7/2003 | Reshef et al. |
| 2005/0059545 | A1 | | 3/2005 | Alonso |
| 2010/0075837 | A1 | * | 3/2010 | Meitzner ............... B01J 27/051 502/220 |
| 2014/0225041 | A1 | | 8/2014 | Archer et al. |
| 2015/0010832 | A1 | | 1/2015 | Kumta et al. |

OTHER PUBLICATIONS

E. Benavente et al, "Intercalation chemistry of molybdenum disulfide," Coordination Chemistry Reviews, vol. 224, pp. 87-109, 2002.
P. Afanasiev, "Synthetic approaches to molybdenum sulfide materials," C. R. Chemie, vol. 11, pp. 159-182, 2008.
M.M. Mdleleni, T.Hyeon, K.S.Suslick, "Sonochemical Synthesis of Nanostructured Molybdenum Sulfide," Journal of the American chemical Society, vol. 120, pp. 6189-6190. 1998.
P. Afanasiev, et al, "Surfactant-Assisted Synthesis of Highly Dispersed Molybdenum Sulfide," Chem. Mater., vol. 11, pp. 3216-3219, 1999.
M.B. Dines, "Lithium intercalation via n-Butylithium of layered transition metal dichalcogenides," Material Research Bulletin, vol. 10 pp. 287-291, 1975.
R. Bissessur, P.K.Y. Liu, "Direct insertion of polypyrrole into molybdenum disulfide," Solid State Ionics, vol. 177, pp. 191-196, 2006.
K. Liu et al, Growth of Large-Area and Highly Crystalline MoS2 Thin Layers on Insulating substrates, Nano letters, vol. 12, pp. 1538-1544. 2012.
K. Zhou, S. Jiang, C. Bao, L. Song, B. Wang, G. Tang, et al., "Preparation of poly(vinyl alcohol) nanocomposites with molybdenum disulfide (MoS2): structural characteristics and markedly enhanced properties," RCS Advances, vol. 2, 2012.

\* cited by examiner

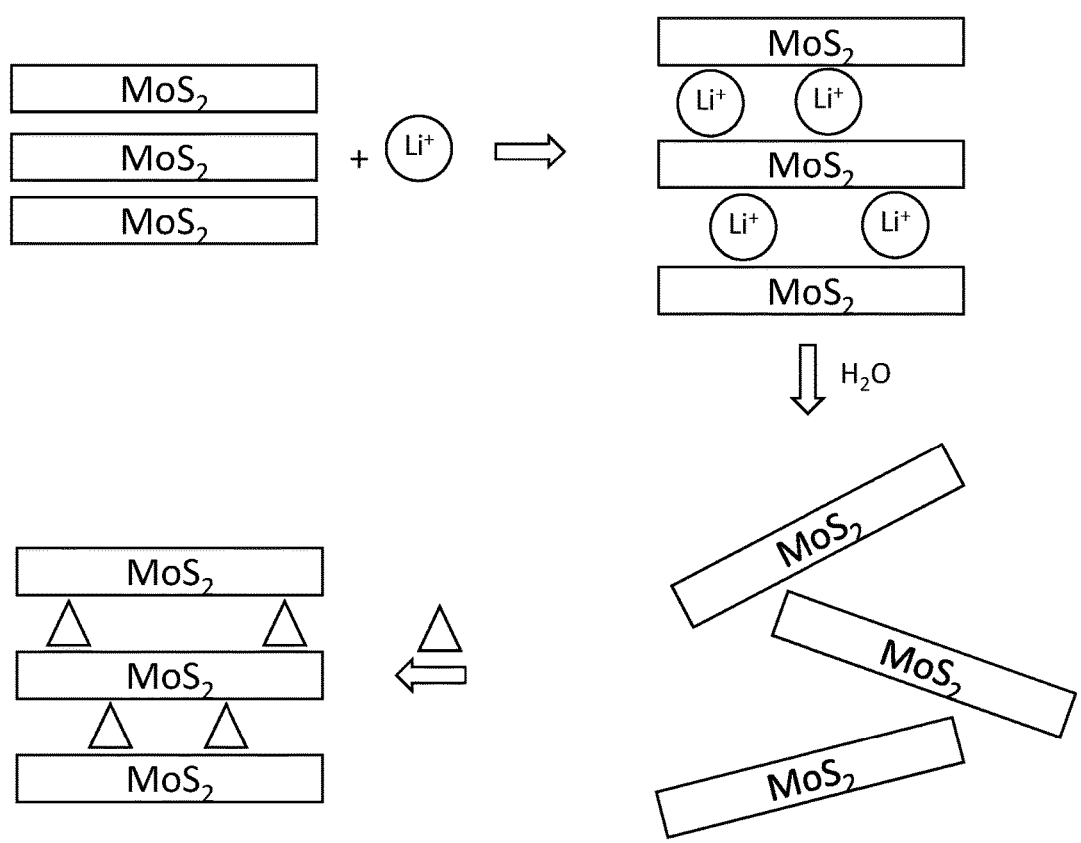

MOS2 FOAM

CROSS-REFERENCE TO RELATED APPLICATIONS

This application claims priority to and benefit of U.S. Provisional Application No. 62/119,534 filed on 23 Feb. 2015.

The aforementioned provisional patent application is hereby incorporated by reference in its entirety.

STATEMENT REGARDING FEDERALLY SPONSORED RESEARCH OR DEVELOPMENT

None.

BACKGROUND OF THE INVENTION

Field of the Invention

The present invention relates to the production of a foam, for example from molybdenum sulfide (MoS), and more particularly, synthesis of molybdenum sulfide ($Mo_xS_y$) foam.

Brief Description of the Related Art

There is a great demand for energy worldwide due to increases in population and economic activities in many parts of the world especially in developing countries such as China and India. The energy supply has to keep pace with energy demand. Thus, there are several options for generating energy including fossil-based fuels, solar, nuclear and wind. Many countries have plans to increase the share of renewables in the energy mix and reduce dependence on fossil fuels.

For the latter, fossil fuel-based energy generation relies mainly on natural gas due to its lesser impact on environment and high energy density. Natural gas is produced as an associated gas in oil wells or as sour gas in gas wells, which contains significant amount of hydrogen sulfide ($H_2S$) and carbon dioxide ($CO_2$). When developing sour gas fields, $H_2S$ and $CO_2$ have to be removed completely before selling the gas for energy generation. In doing so, the $H_2S$ gas is removed by converting it to elemental sulfur through Claus process.

There is a worldwide concern about the increasing environmental effects of oil & gas production. Removal of the sulfur-containing compounds is necessary before utilizing natural gas or any other refinery products.

This large amount of sulfur should bring great motivation and interest for research in this area to come up with different applications that utilize sulfur and hence improve its marketability. One of the forms of utilization is in metal-sulfides, which have a wide range of applications in different industries. Metal sulfides contain at maximum two sulfur atoms per metal and hence have high sulfur content. It follows that with such high content, devising applications for these sulfides will be a suitable way to improve sulfur long-term marketability.

Catalytic chemical processes need materials with high active and accessible surface. $MoS_2$ has been the preferred material option as a catalyst for hydro-desulphurization, which is the catalytic chemical process to remove sulfur from natural gas or other refined chemical products, such as gasoline, jet fuel, kerosene, etc. The molybdenum disulfide $MoS_2$ used to date has a substantially two-dimensional surface, which limits the reactive surface area. One method of increasing the effectiveness of the molybdenum disulphide catalyst would therefore be to create a larger surface area. The challenge is to expand this large surface area into the third dimension.

U.S. Patent Application Publication No. U.S. 2005/0059545 (Alonso et al), granted as U.S. Pat. No. 7,223,713, teaches one method for the synthesis of $MoS_2$ for use as a catalyst with a large surface area. The method involves adding ammonia tetrathiomolybdate salt precursor to a precursor, having an active metal like cobalt. The precursor is decomposed under hydrothermal conditions to form a molybdenum disulfide catalyst in the form of powder, which will also contain carbon.

U.S. Patent Application Publication No. U.S. 2003/0144155 (Tenne et al) also teaches a method of manufacturing a porous matrix of molybdenum disulfide and having nanoparticles of metal chalcogenide inserted into the pores.

Most of the attempts in the past have mainly been approaches to volume applications by using $MoS_2$ powder. One difficulty faced with such application has been the anchoring of the particles of the $MoS_2$ powder into a supporting structure. The supporting structure should not, in itself be an active material, which would otherwise cause inefficiencies in the chemical catalytic process. In the past, additional catalysts and co-catalysts have been used to make $MoS_2$ more active, which is consistent with the industry practice of using chemical treatments instead of making physical improvements.

The literature provides many examples of previous work done with molybdenum sulfide (MoS) relying on conventional synthesis techniques. Other publications describe the improvement of those same techniques with some modifications.

Molybdenum disulfide ($MoS_2$) material has other applications in many industries, which would also benefit from an improved structure. For example, molybdenum disulfide has been used as a lubricant in various applications due to its weak van der Waals bonding between its layers. See, E. Benavente et al, "Intercalation chemistry of molybdenum disulfide," Coordination Chemistry Reviews, vol. 224, pp. 87-109, 2002. A number of different synthesis methods are known in the literature, which will now be discussed.

Sulfidation of the Oxide.

This method involves solid-gas chemical reaction of the corresponding oxide to produce molybdenum disulfide. It is mostly studied for the field of the hydro-treating processes, in which the molybdenum disulfide is used to enhance the hydro-treating process. The morphology of the produced molybdenum disulfide cannot be easily controlled using this synthesis method. See, P. Afanasiev, "Synthetic approaches to molybdenum sulfide materials," C. R. Chemie, vol. 11, pp. 159-182, 2008.

Decomposition of Precursors.

Another method for preparing the molybdenum disulfide is through decomposition of a precursor material. The precursor material is a solid/liquid/gas that has the necessary reactants to produce the final product of molybdenum disulfide, where all reaction takes places on a substrate. This method does not involve any external reactant or process steps to get the product. The final product morphology is determined based on the precursor type and the decomposition reaction. See, for example, P. Afanasiev, "Synthetic approaches to molybdenum sulfide materials," C. R. Chemie, vol. 11, pp. 159-182, 2008. One of the well-known species that acts as a precursor is ammonium tetrathiomolybdate, abbreviated as ATTM or ATM.

Solutions Reaction.

Homogenous reaction that precipitates the molybdenum disulfide as a product is another approach to synthesis the material. This method does not assure the pure products yield of MoS. Other products can be produced from this reaction, like sulfur-rich sulfide, which can be converted to the molybdenum disulfide by thermal decomposition. The slow reaction rate gives better morphology and more control on the $MoS_2$.

The literature has also many examples of how the molybdenum disulfide can be produced directly through a reaction in an aqueous medium. One of the techniques is to use sonochemical synthesis. Nanostructured molybdenum sulfide with high surface area was obtained by this technique. See, M. M. Mdleleni, T. Hyeon, K. S. Suslick, "Sonochemical Synthesis of Nanostructured Molybdenum Sulfide," Journal of the American chemical Society, vol. 120, pp. 6189-6190. 1998. The nanostructured molybdenum sulfide is prepared by irradiating a slurry solution of molybdenum hexacarbonyl and sulfur along with other chemicals under high intensity ultrasound. Analysis of the produced sample shows larger surface area in comparison to the conventional method of decomposing ammonium tetrathiomolybdate (ATTM) under Helium. Other approaches show the preparations of MoS in aqueous solution by adding surfactants producing high surface area. Metal usually not easily to form aqueous solution and requires $H_2S$ or alkali metal sulfides. See, P. Afanasiev, et al, "Surfactant-Assisted Synthesis of Highly Dispersed Molybdenum Sulfide," Chem. Mater., vol. 11, pp. 3216-3219, 1999.

Surfactant-Assisted Preparation.

This preparation method involves the addition of a surfactant to the preparation technique chosen; it could be either used in either chemical reaction or physical preparations. Surfactants are species that can be attached to the surfaces of the layered material keeping a space between them. In molybdenum sulfide preparations, the surfactant is added to separate the layer of the molybdenum sulfide and control the morphology to fit a desired application. The produced molybdenum sulfide is tested for its mechanical and chemical properties. Other approaches are based on chemical reactions by adding certain types of surfactants to the reactions mixture. See, P. Afanasiev, "Synthetic approaches to molybdenum sulfide materials," C. R. Chemie, vol. 11, pp. 159-182, 2008.

Intercalation, Exfoliation and Restacking Techniques.

Intercalation can be defined as a process of inserting guest molecules between layered materials in order to ease the separation of the layered materials into single layers. There are two methods for the intercalation step: intercalation of lithium and intercalation of molecular species. The first method is performed by the insertion of alkali metals into the molybdenum sulfide layers such as lithium (Li). It is referred to as a direct intercalation process, which is commonly used rather than other metals. Some work was done to examine intercalation with other alkali metal, see, E. Benavente et al, "Intercalation chemistry of molybdenum disulfide," Coordination Chemistry Reviews, vol. 224, pp. 87-109, 2002, yet the focus is on Li as it has potential application in high power Li batteries. The process can be described as an ion-electron transfer reaction. Intercalation leads to structural, thermodynamics and reactivity changes in the molybdenum sulfide. Lithium can be intercalated into the molybdenum sulfide layers by two methods: chemical and electrochemical methods. The chemical method is more commonly used, which is carried out by dispersing the molybdenum sulfide in a solution of butyl lithium and organic solvent. See, M. B. Dines, "Lithium intercalation via n-Butyllithium of layered transition metal dichalcogenides," Material Research Bulletin, vol. 10 pp. 287-291, 1975. FIG. 1 shows a schematic of the process of intercalation by lithium. See, E. Benavente et al, "Intercalation chemistry of molybdenum disulfide," Coordination Chemistry Reviews, vol. 224, pp. 87-109, 2002.

The second method is the intercalation of a molecular species, which is similar to the first method, except that the second method involves the insertion of a compound between the layers. The intercalation step is followed by exfoliation. This step is aimed to remove the molecular species added by a solution that dissolves or react with the molecular species and separate the layers. FIG. 2 adopted from P. Afanasiev, "Synthetic approaches to molybdenum sulfide materials," C. R. Chemie, vol. 11, pp. 159-182, 2008, shows how this is done. The final step involves adding certain surfactant that fit the material to hold the final structure.

Other than the well-understood approach of Lithium intercalation, different types of guest species have been reported in the literature. Different types of guest species can be intercalated into the molybdenum sulfide, such as polymers, molecular donor, cationic species or organometallic species. A recent work shows that colloidal polymer suspensions of guest species could intercalate the molybdenum sulfide. See, R. Bissessur, P. K. Y. Liu, "Direct insertion of polypyrrole into molybdenum disulfide," Solid State Ionics, vol. 177, pp. 191-196, 2006.

Another work shows the molybdenum sulfide as thin layers in an electronic application. A thin sheet of molybdenum sulfide has been deposited on insulating substrates. This thin sheet is highly crystalline and has high electron mobility, which matches the properties of the micro-mechanical exfoliated sheets from MoS2 crystals. K. Liu et al, "Growth of Large-Area and Highly Crystalline MoS2 Thin Layers on Insulating substrates, Nano letters, vol. 12, pp. 1538-1544. 2012.

An Example of preparation of $MoS_2$/polyvinyl alcohol nanocomposite is known from K. Zhou, S. Jiang, C. Bao, L. Song, B. Wang, G. Tang, et al., "Preparation of poly(vinyl alcohol) nanocomposites with molybdenum disulfide ($MoS_2$): structural characteristics and markedly enhanced properties," *RCS Advances*, vol. 2, 2012. The synthesis started with commercial material of $MoS_2$ solvothermal step with butyl lithium (a known chemical for getting Li ions inside the sheets of $MoS_2$) which produces $Li_xMoS_2$. The exfoliated $MoS_2$ layers were produced from hydrolysis and ultrasonication of $Li_xMoS_2$ to produce a clean colloidal suspension with $MoS_2$ layers separated. The layers were then added to polyvinyl alcohol polymer solution by solvent blending method, which produces the final mixture that was dried to get the film nanocomposite.

Uses of the molybdenum disulfide catalyst are known, for example, from U.S. Pat. No. 8,673,805 (Anand et al) which teaches the conversion of sugar alcohol to a hydrocarbon.

SUMMARY OF THE INVENTION

In a preferred embodiment, the present invention is a method for the synthesis of molybdenum disulphide foam from a film, wherein the porosity of the foam can be controlled. The benefit of being able to control the porosity is to adapt the porosity to various applications of the molybdenum disulfide foam and its specific requirements. In particular, the prior art does not discuss monolithic molybdenum disulphide structures where cavities are interconnected to create a large processing surface area.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description, which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which:

The FIGURE is a diagram showing intercalation of the molybdenum sulfide with Lithium and steps of intercalation, exfoliation and restacking of molybdenum sulfide.

DETAILED DESCRIPTION OF THE PREFERRED EMBODIMENTS

The preferred embodiments of the inventions are described with reference to the drawings.

The inventors have recognized from study of the literature that a new form of the molybdenum sulfide would provide new uses and applications for molybdenum sulfide. The method presented in this disclosure aims to achieve the following set of objectives:
1. Prepare porous molybdenum sulfide $Mo_xS_y$ foam. The foam size is dependent of the container, but we produced in lab foam size of 1 cm by 3 cm with a thickness of 0.1 centimeter.
2. Screen different preparation methods that control porosity.
3. Characterize the material using several methods including structural, compositional and thermal properties.
4. The porous $Mo_xS_y$ created was used in a hydro-desulfurization application.

The present disclosure teaches a method of synthesizing a foam made from molybdenum sulfide with interconnected cavities. The foams created have typically a physical size of 3×2 cm and a thickness of 0.1 cm, but this is not limiting of the invention.

It is believed that similar methods can be used for other sulfides, for example tungsten sulfide, as well as for boron nitride and graphene.

Two methods for the synthesis of the foam will now be described.

Top-Down Approach.

The method is summarized in The FIGURE.

This synthesis method starts by using molybdenum sulfide in the form of a solid material. An intercalation species used to intercalate the molybdenum sulfide material in the presence of other species, such as laponite or polymers such as PVOH. Other intercalation species could be positive ions of alkylammonium cations, which would enhance the final structure of the molybdenum sulfide foam (see A. S. Golub, Y. V. Zubavichus, Y. L. Slovokhotov, Y. N. Novikov, and M. Danot, "Layered compounds assembled from molybdenum disulphide single-layer and alkyammonium cations," *Solid State Ionics*, vol. 128, pp. 151-160, 2000.).

Another example involves direct insertion of polypyrrole into the Li-exfoliated sheets of $MoS_2$ (see R. Bissessur and P. K. Y. Liu, "Direct insertion of polypyrrole into molybdenum disulfide," Solid State Ionics, vol. 177, 2006) Non-limiting examples of intercalation species that can be used include, but are not limited to organic materials, inorganic materials and organometallic compounds. It is known that alkali metals show good performance for intercalation of layered material and in one non-limiting example lithium was used. Further examples are listed in S. Wang, C. An, and J. Yuan, "Synthetic Fabrication of Nanoscale MoS2-Based Transition Metal Sulfides," Materials, vol. 3, pp. 401-433, 2010.

The FIGURE shows the intercalation of a stack of the molybdenum sulfide layers using Lithium ions as an intercalating species. Exposure of the lithium-molybdenum sulfide species to water leads to exfoliation of the molybdenum sulfide layers. A spacer, for example but not limited to, polyvinyl alcohol is used. This is used to retain a space between the exfoliated layers. It will be appreciated that other water soluble molecules and macromolecules could be use.

Bottom-Up Approach.

This synthesis method starts by a precursor material, which is converted later to the molybdenum sulfide foam. One of the known precursors is ammonium tetrathiomolybdate (abbreviated ATTM/ATM). A mixture of Laponite and ATTM was made with equal compositions of both species. The aqueous solution of the species was freeze dried, before heated at several temperatures, to decompose to molybdenum sulfide.

Instead of Laponite, it would be possible to use naturally-occurring montmorillonite or smectite, for example.

The present invention has multiple advantages over prior approaches:
  Less volume/space required to achieve same effect as conventional solutions
  Increased efficiency if applied for liquid and gas processes
  Besides hydro-desulphurization other fields off applications are apparent: sense and control, structural materials

EXAMPLES

Example 1 Synthesis Methods of $MoS_2$ Foam

The following chemicals were used. Poly (vinyl alcohol) 99+% hydrolyzed (from Sigma-Aldrich), molybdenum (IV) sulfide powder <2 micro 99% (from Sigma-Aldrich), Ammonium tetrathiomolybdate (ATTM) 99.97% metal basis (from Sigma-Aldrich) along with commercially available laponite clay powder (e.g. from Byk), all material were used as received. Deionized water used was supplied from filtration unit in the laboratory.

Preparation of Poly (Vinyl Alcohol) Solution

A 10% aqueous solution of PVOH polymer was prepared and kept in a sealed volumetric flask. The solution viscosity was high due to large molecular weight (MW) of polymer; hence, the aqueous solution was further diluted to 7.4% by mass to be suitable for use with foam synthesis.

In alternative examples, it is envisaged that other polymers such as, but not limited to, polyethyleneoxide, sulfonated polystyrene, polyacrylic acid, or polyacrylamide could be used

Preparation of Molybdenum Sulfide Foam Material (as a Monolith)

The foam material was initially prepared by mixing around 10 g $MoS_2$ powder with around 0.15 g ATTM powder in approx. 50 g of deionized water and kept for sonication for 1 hour. The PVOH polymer solution (100 g) was added to the $MoS_2$/ATTM mixture and left for stirring on an IKA plate magnetic plate at a speed of 6-8 for 1 day. 3 g of the laponite clay was added to the mixture solution, kept stirring for 10 min and then the solution was transferred to petri dishes allowing the solution to dry in a fume hood for several days.

Calcination of Dry Molybdenum Sulfide Mixture in a Nitrogen Gas Environment

The dry film was thermally treated in a tube furnace in a nitrogen gas environment to decompose the ATTM, remove any residual water and decomposing partially the PVOH polymer solution to create pores. Starting from room temperature, the tube with molybdenum sulfide samples inside was firstly heated at a low rate of 4 C. degrees per min to temperatures between 20-80° C. followed by constant heating at 80° C. for 20 min. this first heating step was aimed to remove any contaminations and assure controlled environment of nitrogen inside tube. The sample was further heated at a higher rate of 10 C. degree per min to a set point of 950° C. ranging from 100-950° C. followed by constant heating at 950° C. for 30 min.

Use of the Molybdenum Sulfide Foam

The affinity of the $MoS_2$ porous foam was estimated from the liquid adsorption of an organosulfur compound dibenzothiophene (DBT) in an organic solvent (Toluene). Two standard solutions were made with different concentrations of DBT in toluene. The selected method includes thermodynamic equilibrium, which occurs during the immersion of the foam in the DBT solution. Additionally, kinetic takes place when testing the samples in different DBT concentrations, which induce a mass transfer driving force due to concentration difference.

The chemicals used in this procedure were toluene purines ≥99.5% GC (Sigma—from Aldrich) and dibenzothiophene 98% (from Sigma-Aldrich) as received to prepare the standard solutions.

Preparation of DBT Standard Solutions

Two standard solutions of DBT in toluene were made at the following concentrations: 100 and 1000 ppm labeled as (solution 1) and (solution 2). The appropriate solid amount of DBT was measured accurately using a balance and added to a volumetric flask and filled until the mark with toluene.

Adsorption Experiment

Immersion of approximately 10 mg of hybrid MoS foam into 3 mL of each solution in capped small vials. The vials were sonicated for 80 min at a power of 100 in a water bath to enhance the adsorption of DBT on the surface of molybdenum sulfide foam. The vials kept stable on the fume hood for static immersion in the solution for a period of 3 days. An aliquot was taken from each sample and further diluted with toluene for GC runs. The vials with solution 2 were diluted to 500 ppm, while the solution 2 vials were diluted to 10 ppm. The new solutions made from immersion aliquots were ran on the GC to measure its concentration.

Based on the standard calibration measurement of some standard DBT solution with known concentrations, the unknown samples concentrations were estimated from a calibration curve Further uses of the molybdenum disulfide include a use as a lubricant, to produce hydrogen and as an electro-catalyst, for example in lithium batteries.

Furthermore, the molybdenum disulfide has been used in hybrid material with reduced graphene oxide. A hybrid material of silicon nanowires and molybdenum trisulfide shows a good performance in photo-electro-chemical production of hydrogen gas. Flexible transistors can be used made of molybdenum sulfide.

Other uses include thermal and acoustic insulation and filtration.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for the synthesis of molybdenum sulfide foam comprising:
    providing a combination of precursors, the precursors comprising molybdenum sulfide powder, ammonium tetrathiomolybdate, a gelling agent and a polymer;
    drying the combination of precursors to form a film; and
    heating the film to generate the molybdenum sulfide foam.

2. The method of claim 1, wherein the heating takes place in a nitrogen gas atmosphere.

3. The method of claim 1, wherein the precursors polymer comprises at least one of, PVOH, polyethyleneoxide, sulfonated polystyrene, polyacrylic acid, or polyacrylamide.

4. The method of claim 1, wherein the gelling agent is one of laponite, montmorillonite or smectite.

* * * * *